June 16, 1959 W. VILLMANN ET AL 2,891,114

CIRCUIT ARRANGEMENT FOR GOVERNING THE OPERATION
OF KEY-CONTROLLED TELEPHONE
SWITCHING APPARATUS

Filed Jan. 28, 1955 2 Sheets-Sheet 1

Inventors.
Walter Villmann,
Alwin Scharpf, &
Martin Ragaller.

By. [signature] Atty.

Inventors.
Walter Villmann,
Alwin Scharpf, &
Martin Ragaller.

By. [signature] Atty.

United States Patent Office 2,891,114

Patented June 16, 1959

2,891,114

CIRCUIT ARRANGEMENT FOR GOVERNING THE OPERATION OF KEY-CONTROLLED TELEPHONE SWITCHING APPARATUS

Walter Villmann, Munich, Alwin Scharpf, Ottobrunn, and Martin Ragaller, Munich, Germany, assignors to Siemens & Halske Aktiengesellschaft, Munich and Berlin, Germany, a German corporation Application January 28, 1955, Serial No. 484,660

Claims priority, application Germany February 9, 1954

5 Claims. (Cl. 179—90)

Figure 1A:
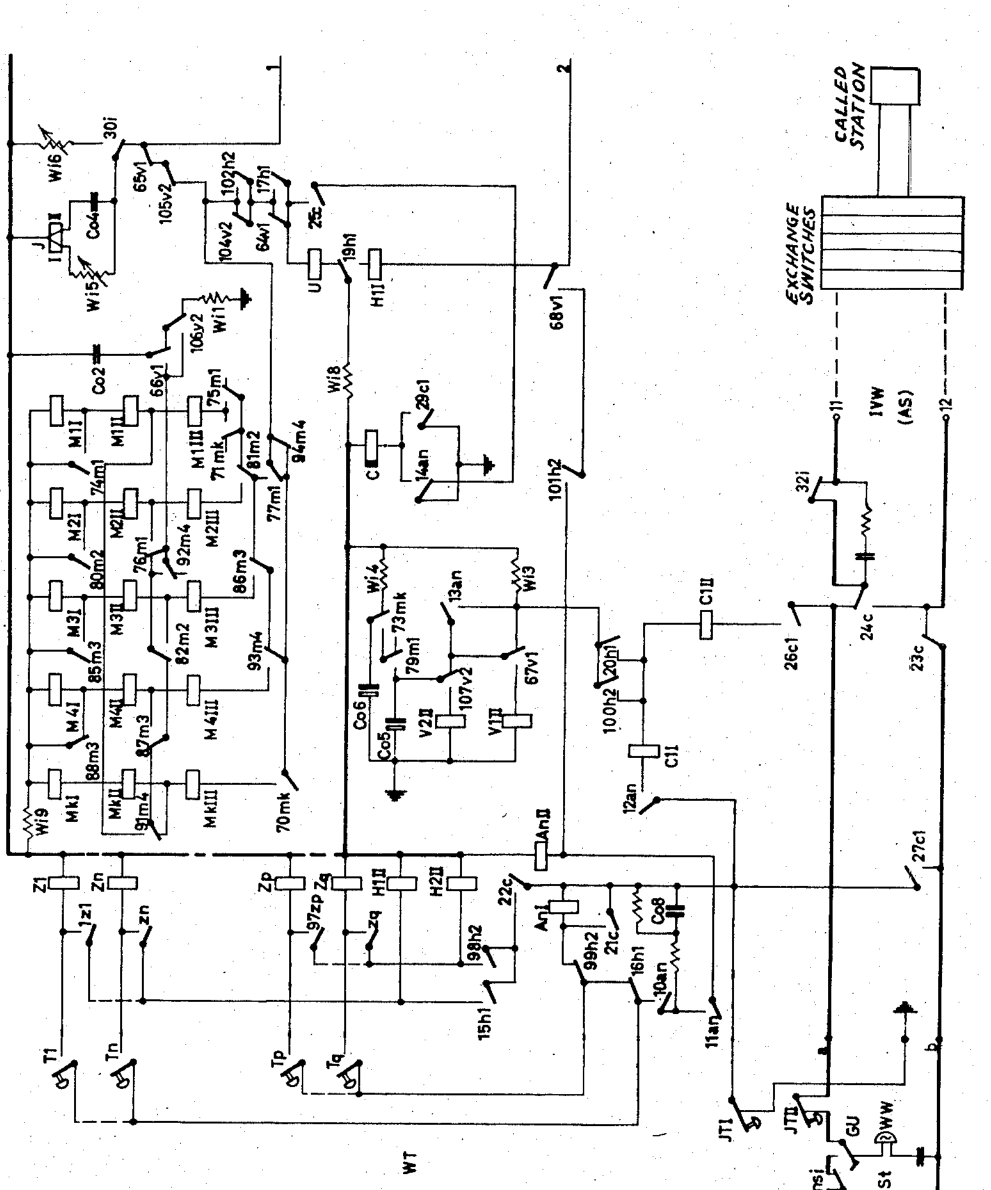

The present invention relates to a circuit arrangement for key-controlled selection in signalling systems, particularly telephone systems.

Known systems of this type include keyboard number transmitters into which the digits of a number to be called can be entered at virtually any desired speed, whereupon the series of selecting impulses, corresponding to the selected number and temporarily stored in the form of electrical criteria, are automatically transmitted with the required time-spacing.

Other known systems of the above type are those which, upon depression of a single key, select a predetermined, preferably multiple-digit, number allotted to that key. Systems of this nature will be designated hereinafter as "automatic selectors."

In accordance with the present invention, the numbers to be selected in response to key depression are subdivided into at least two digit groups, and the second of these groups is selected after the first group with a time delay that exceeds the customary interval between the selection of two consecutive digits of a number to be called.

Advantageously, the first digit group identifies an exchange involved in the establishment of the desired connection, while the second digit group essentially corresponds to the subscriber's number. For example, in the case of connections from private branch exchanges to the public telephone network, the first digit group may designate the exchange number, and the selection of this number may establish the connection between the P.B.X and the local public exchange. In this case, the first digit will generally consist of but a single number. The second digit will then represent the number of the desired subscriber within the public telephone network.

In certain superregional toll systems, the first digit group, comprising several digits, represents the identifying number of the destination exchange to be called in automatic toll traffic. The second digit group then essentially constitutes the number of the desired subscriber within the area of the destination exchange; alternatively, it may identify a further exchange operator's position that can be reached through the exchange identified by the first digit group and that is effective in completing the connection to the desired subscriber.

The automatic selectors, defined above, are capable of selecting both digit groups upon depression of a single key. For example, if such an automatic selector is employed in a P.B.X, depression of the selecting key allotted to a subscriber of the public network automatically causes selection of the exchange identification number, followed by selection of the desired subscriber's number.

In other situations it may be desirable to construct the automatic selectors in such a manner that each digit group is selected in response to a separate switching operation on the part of the calling subscriber. For example, superregional toll systems are known in which certain similar official stations within the areas of different destination exchanges have the same call number allotted thereto. When employing the automatic selector in networks of this nature, it is merely necessary to provide selecting keys corresponding to the individual destination exchanges, and other keys corresponding to those official stations which have identical numbers independently of the destination exchanges involved. Making the selection of the destination exchanges and the selection of the official stations responsive to separate and distinct keys, results in a number of possible combinations which permits a far greater number of lines to be called than there are selecting keys.

In keyboard number transmitters, the two groups of digits are entered into the keyboard in uninterrupted succession. When such a transmitter is used in P.B.X installations, it may be constructed in such a manner that it will automatically divide the sequence of digits entered, into two groups. For example, during depression of the keys corresponding to the number of a subscriber of the public network, with initial actuation of the keys identifying the exchange number, the transmitter may interpose, after the automatic selection of this exchange number, a prolonged interval before commencing the selection of the number of the desired subscriber.

All systems of the kind here under consideration are provided, as is well-known, with switching elements or means for producing a compulsory time interval between the selection of two consecutive digits of a called number. This interval is required for the hunting operation of selector switches which, after having been set relative to a line or trunk group, are required to find an idle individual line or trunk by hunting in such group. Therefore, the duration of this compulsory interval is determined in accordance with the longest hunting interval that may arise.

If this predetermined interval were to be retained in the automatic selection of numbers that are divided into two digit groups, faulty connections might result. For example, when establishing a connection from a P.B.X installation to the public network, the time required between the selection of the exchange number and completion of a connection with an idle trunk of the public exchange may be in excess of the hunting interval normally provided.

Similarly, in the above-mentioned superregional toll networks in which the first digit group identifies the destination exchange while the second group is allotted to a further exchange operator's position connectible to the destination exchange, the time required for completing the connection to this further position from the destination exchange may exceed the normal hunting interval.

In both of these instances, arrangements of the type heretofore employed might begin with the selection of the second digit group before the connection had been switched through. This would result in garbling of the selection and hence in faulty connections.

This disadvantage is avoided by the present invention. As noted initially, the invention permits the time interval between selection of the two digit groups to be determined independently of the hunting interval between successive digits. To increase this hunting interval beyond the required amount would not be advantageous. The interval between the two digit groups may be made as long as appears indicated in view of the possible time requirements for completing a connection, without thereby unduly delaying the connection in other respects.

The invention will now be described in greater detail with reference to the accompanying drawings, which illustrate in diagrammatic manner one embodiment of a circuit arrangement incorporating the present invention.

Figure 1B:
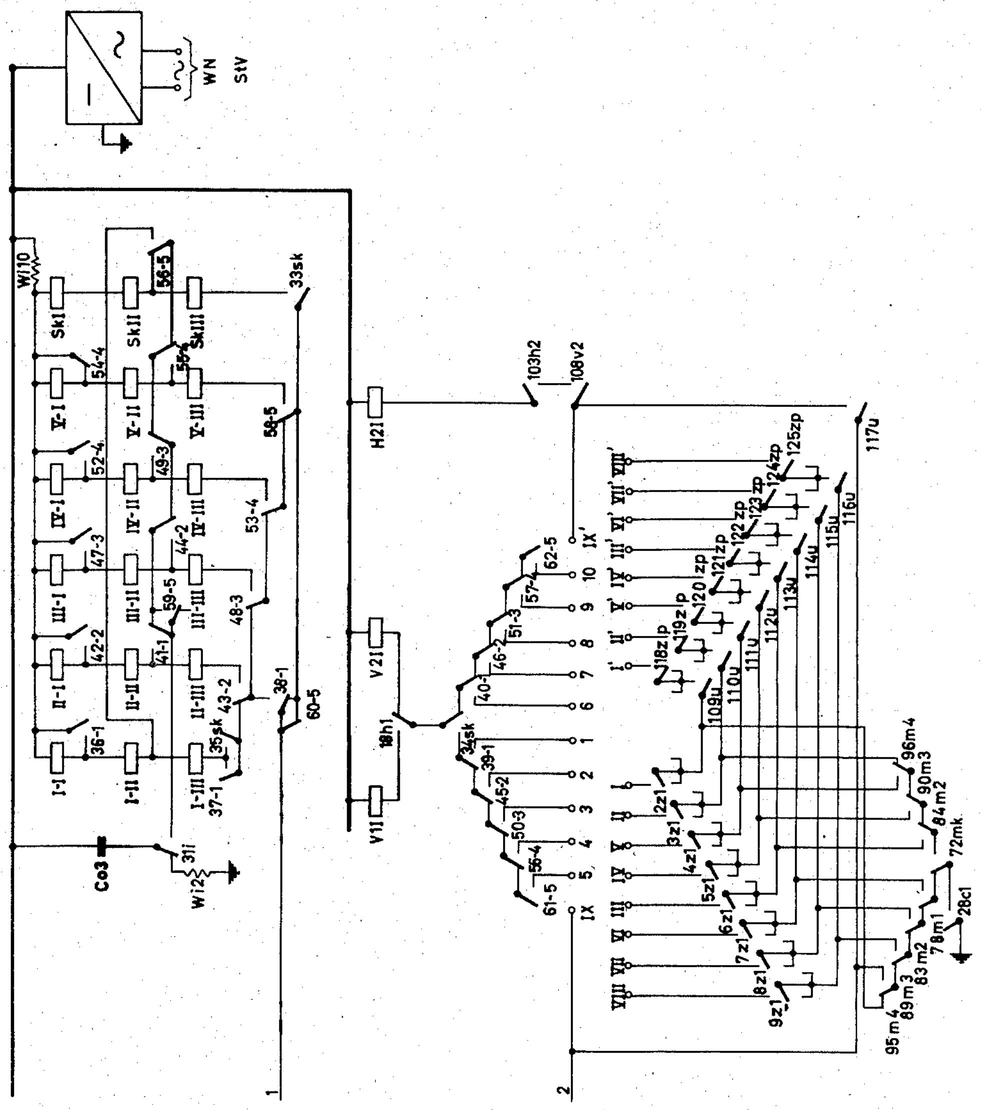

In the drawings, Figs 1*a* and 1*b*, when placed side by side with Fig. 1*b* on the right of Fig. 1*a*, illustrate the circuit diagram of the embodiment.

The illustrated embodiment shows an electrically operating automatic selector to which are connected a subscriber's station S*t* of conventional construction, and a keyboard WT.

Of the details of the station S*t*, the drawing indicates the switchhook GU, the dial pulse contact *nsi*, and the A.C. ringer WW. Reference character MT designates the assembly of microphone, receiver, induction coils, etc.

The keyboard WT comprises two groups of keys, from T1 to T*n*, and from T*p* to T*q* respectively. Each key is connected to an associated, correspondingly indexed, marking relay Z.

Line conductors 11 and 12 connect the automatic selector with a preselecting device, such as preselector I.VW or call finder AS, of the local exchange. A source of current S*t*V (Fig. 1*b*) is connected to the local A.C. network WN on its input side and supplies a D.C. voltage, for example of 60 v., on its output side. Is serves to supply the automatic selector with current.

It shall be assumed that the automatic selector is being used in a P.B.X installation and that selector key T1 identifies the call number 31391 of a subscriber of the public telephone system. Preceding this number, it is necessary to select the exchange-identifying number, which shall be assumed to be the digit "0." It is further assumed that depression of key T1 alone is to initiate the selection of both the exchange number and the subscriber's number, so that the automatic selector must transmit the digit sequence 0—31391.

When the hand set at station S*t* is lifted, the switchhook contact GU closes the subscriber's loop circuit in known manner, and this loop circuit is then switched through to an idle switching device by the preselector at the exchange. After receiving the dial tone, the subscriber depresses the selector key T1. This energizes relays Z1 and A*n* over a circuit extending from (1) Battery, Z1, T1, 16*h*1, 99*h*2, A*n*I, JTI, to ground.

Relay Z1 actuates its contacts 1*z*1 to 9*z*1, and relay A*n* operates its contact 10*an* to 14*an*. Contacts 1*z*1 connects winding II of relay H1; this relay operates and actuates its contacts 15*h*1 to 20*h*1. Contact 14*an* actuates relay C having contacts 21*c* to 25*c*. Contact 21*c* short-circuits the initially energized winding I of relay A*n*. So long as key T1 remains depressed, it maintains a holding circuit for winding II of relay A*n*, this key-controlled circuit extending from (2) Battery, A*n*II, 11*an*, 10*an*, T1, 1*z*1, 15*h*1, 22*c*, JTI to ground.

Contacts 23*c* and 24*c* disconnect station S*t* from the line conductors 11 and 12; at the same time, contact 24*c* takes over the function of closing the line loop to the exchange.

Upon release of key T1, relay A*n* restores and opens the holding circuit (2) for its winding II. Release of relay A*n* is delayed, as the holding winding II continues to be energized by the discharge current of capacitor C*o*8. Relays Z1 and H1 remain energized over a circuit extending from (3) Battery, $$\frac{Z1, 1z1}{H1II}$$

15*h*1, 22*c*, JTI to ground.

Contact 20*h*1 has closed the following circuit for relay C1 having contacts 26*c*1 to 29*c*1:

(4) Battery, W*i*3, 20*h*1, C1I, 12*an*, JTI, to ground

Upon interrupting circuit (4) at contact 12*an*, relay C1 remains energized over a holding circuit extending from (5) Battery, W*i*3, 20*h*1, C1II, 26*c*1, *a*, JTII, GU, *nsi*, MT, *b*, 27*c*1, JTI to ground.

Contact 14*an* closes the circuit for the impulse relay J, comprising contacts 30*i* to 32*i*, this circuit extending from:

(6) Battery, $$\frac{JI, Wi5}{JII, Co4}$$

30*i*, 65*v*1, 105*v*2, 104*v*2, 64*v*1/17*h*1, 25*c*, 14*an* to ground.

Relay J operates in a self-interrupting circuit at a frequency corresponding to the required impulse ratio between the selecting impulses. Resistor W*i*5 serves to determine the pulse interval while resistor W*i*6 determines the length of the impulses. Contact 32*i* transmits the selecting impulses in the form of loop interruptions.

Contact 31*i* steps an impulse counting chain, comprising relays I to V and S*k*, by means of discharge current impulses of capacitor C*o*3, this capacitor being charged over resistor W*i*2 during the pulse intervals. Upon the first energization of relay J, relay S*k*, having contacts 33*sk* to 35*sk*, is connected over a circuit extending from (7) Battery, W*i*10, S*k*I, S*k*II, 56—5, 55—4, 49—3, 44—2, 41—1, 31*i*, C*o*3 to battery.

Relay S*k* is held over a holding circuit extending from (8) Battery, W*i*10, S*k*I, S*k*II, S*k*III, 33*sk*, 38—1/60—5, 1, 65*v*1, 105*v*2, 104*v*2, 64*v*1/17*h*1, 25*c*, 14*an* to ground.

Contact 35*sk* connects relay I, having contacts 36—1, to 41—1.

Upon the second energization of relay J, relay II having contacts 42—2 to 46—2 is energized over a circuit extending from:

(9) Battery, W*i*10, II—I, II—II, 41—1, 31*i*, C*o*3 to battery.

Contact 43—2 disconnects relay I, which was previously held over its contact 38—1 in a circuit extending from

(10) Battery, W*i*10, 36—1, I—II, I—III, 37—1/53*sk*, 43—2, 38—1, 1, 65*v*1, 105*v*2, 104*v*2, 64*v*1/17*h*1, 25*c*, 14*an* to ground.

Each further impulse, that is, each further operation of relay J, causes the next-succeeding relay of the chain to be energized and the preceding relay to be disconnected. Thus, after five impulses, relay V (having contacts 56—5 to 61—5) will be operated, and the relays V and S*k* will be held in a holding circuit extending from

(11) Battery, W*i*10, $$\frac{SkI, SkII, SkIII, 33sk}{54—4, V—II, V—III, 58—5}$$

38—1, 1, 65*v*1, 105*v*2, 104*v*2, 64*v*/17*h*1, 25*c*, 14*an* to ground.

Upon the sixth impulse, relay I is again energized over a circuit extending from

(12) Battery, W*i*10, I—I, I—II, 56—5, 55—4, 49—3, 44—2, 41—1/59—5, 31*i*, C*o*3 to battery.

Relay I at contact 38—1 opens circuit (11) and thereby restores not only relay V but also relay S*k*. A holding circuit for relay I is established, corresponding essentially to circuit (10) except that contact 35*sk* is now open.

The switching operations upon the seventh to tenth impulses then are the same as those for the second to fifth impulses. The circuit conditions for the sixth to tenth impulses differ from those for the first to fifth impulses of the counting chain only in that relay S*k* is not connected.

Contacts of relays I to V and S*k* constitute a contact field, whose outlets are designated 1 to 10 in Fig. 1*b*. A further contact field is formed by contacts 2*z*1 to 9*z*1 of relay Z1, and its outlets are designated I to VIII. The number of these outlets corresponds to the maximum number of denominational orders in the numbers that can be selected by means of the automatic selector.

The field of contacts of relay Z1 is multipled with the corresponding contact fields of the other marker relays of the first group, that is, relays Z2 to Z*n*, as indicated in the drawing, but of course the outlets of the respective contact fields are separate from each other. This multiple is connected with a further contact field comprising contacts or relays M1 to M4 and M*k*, this field moreover having a separate outlet IX. Relays M1 to M4 and M*k* constitute a counting chain for the selecting impulse series, the switching of which will be presently explained.

The contact field outlets on the two sides must be imagined to be multipled or grouped together in accordance with the particular number to be called. For the number 31391, plus exchange identification "0," which have been presumed to be represented by relay Z1, the following multiple scheme accordingly applies:

| 0—31391 | Jumpers between outlets |
|---|---|
| 0 | 10—I |
| 3 | 3—II |
| 1 | 1—III |
| 3 | 3—IV |
| 9 | 9—V |
| 1 | 1—VI |
| Switch-over wiring | IX—VII |

Upon closure of contact 14*an*, relay J starts the transmission of the selection impulses with simultaneous stepping of the counting chain comprising relays I to V and S*k*, as above described. After ten impulses, corresponding to the exchange identifying digit "0," a circuit for relay V1 is established, extending from

(13) Battery, V1I, 18*h*1, 34*sk*, 40—1, 46—2, 51—3, 57—4, 62—5, jumper 10—I, 2*z*1, 95*m*4, 89*m*3, 83*m*2, 78*m*1, 72*mk*, 28*c*1 to ground.

Contact 65*v*1 interrupts the circuit (6) for relay J and the holding circuit for the particular impulse counting chain relay then operating, that is, relay V in the present example. Contact 66*v*1 advances the counting chain for the selection impulse series by one step. The above explanations regarding the stepping of the impulse counting chain apply analogously to the stepping of this counting chain for the series of selection impulses. In the present instance, the discharge current impulse of capacitor C*o*2, which has been charged over resistor W*i*1, energizes relay M*k* having contacts 70*mk* to 73*mk*. This relay establishes its holding circuit and at the same time energizes relay M1 with associated contacts 74*m*1 to 79*m*1; the pertinent circuits being

(14) Battery, W*i*9, M*k*I, M*k*II, 91*m*4, 87*m*3, 82*m*2, 76*m*1, 66*v*1, C*o*2, battery;

(15) Battery, W*i*9, M*k*I, M*k*II, M*k*III, 70*mk*, 77*m*1/94*m*4, 104*v*2, 17*h*1, 25*c*, 14*an* to ground; and

(16) Battery, W*i*9, M1I, M1II, M1III, 71*mk*, 81*m*2, 86*m*3, 93*m*4, 77*m*1/94*m*4, 104*v*2, 17*h*1, 25*c*, 14*an*, to ground.

Contact 72*mk* interrupts circuit (13) and thus restores relay V1. This relay is released with considerable delay as its winding II continues to receive, over contacts 67*v*1 and 107*v*2, the discharge currents of capacitors C*o*5 and C*o*6, which are connected in parallel over contacts 73*mk* and 79*m*1. These capacitors were respectively charged over resistor W*i*3 and contacts 67*v*1 and 107*v*2, and over resistor W*i*4 and contact 73*mk*. The delay in release of relay V1, which is governed by the sum of the capacitances of the two capacitors C*o*5, and C*o*6, is determined in accordance with prevailing conditions in such a manner that, after selection of the exchange identification number, the connection to the public exchange must have been completed with certainty before the automatic selector will transmit the succeeding series of selection impulses.

Upon release of relay V1, circuit (6) is closed again. Relay J continues to transmit the impulses. After three impulses, relay V1 is again operated over a circuit extending from

(17) Battery, V1I, 18*h*1, 34*sk*, 39—1, 45—2, 50—3, jumper 3—II, 3*z*1, 96*m*4, 90*m*3, 84*m*2, 72*mk*, 28*c*1, to ground.

Relay M2, comprising contacts 80*m*2 to 84*m*2, is operated and establishes its holding circuit over contact 81*m*2 which at the same time restores relay M1. Contact 84*m*2 opens circuit (17). Relay V1 is again restored with delay.

As contact 79*m*1 has been returned to its normal position, the release time of relay V1 is now governed solely by the capitance of capacitor C*o*5. This release time corresponds to the customary hunting interval to be maintained between two successive series of selection impulses. This interval is shorter than the interval interposed after selection of the exchange identifying number by virtue of the parallel connection of capacitors C*o*5 and C*o*6.

Contact 65*v*1 again closes circuit (6). The next three circuits for operating relay V1, corresponding to the digits 1, 3 and 9 of the assumed number 0—31391, are respectively as follows:

(18) Battery, V1I, 18*h*1, 34*sk*, 39—1, jumper 1—III, 6*z*1, 84*m*2, 72*mk*, 28*c*1 to ground;

(19) Battery, V1I, 18*h*1, 34*sk*, 39—1, 45—2, 50—3, jumper 3—IV, 5*z*1, 90*m*3, 84*m*2, 72*mk*, 28*c*1 to ground; and

(20) Battery, V1I, 18*h*1, 34*sk*, 40—1, 46—2, 51—3, 57—4, jumper 9—V, 4*z*1, 96*m*4, 90*m*3, 84*m*2, 72*mk*, 28*c*1 to ground.

Contact 66*v*1 now connects relay M1; and the holding circuit for relay M*k* is opened at contact 77*m*1. Relay M*k* remains restored during the further series of selection impulses. The open contact 73*mk* prevents a delay in the restoration of relay V1 by capacitor C*o*6 after the fifth series of selection impulses.

The next circuit for operating relay V1, corresponding to the last digit "1" of the called number 0—31391, extends from

(21) Battery, V1I, 18*h*1, 34*sk*, 39—1, jumper 1—VI, 7*z*1, 78*m*1, 72*mk*, 28*c*1 to ground.

The stepping of the impulse-series counting chain next closes a circuit for the releasing winding I of relay H1, extending over the switch-over releasing wiring. This circuit extends from

(22) Battery, W*i*8, 19*h*1, H1I, 2, jumper IX—VII, 8*z*1, 83*m*2, 78*m*1, 72*mk*, 28*c*1 to ground.

Winding I of relay H1 is energized in opposition to the holding winding II of this relay. Relay H1 is accordingly restored. Its contact 15*h*1 opens the holding circuit (3) for relay Z1, and the latter is then likewise restored. Contact 17*h*1 opens the holding circuit for relays M1 to M4 and M*k*. Contact 20*h*1 opens circuit (5). Relay C1, and then relay C, are restored, and relay C through its contact 23*c* and 24*c* causes the station S*t* to be connected to the line conductors again. This terminates the functioning of the automatic selector.

If an eight-digit number is selected, the special switch-over releasing wiring is not required. After selection of the last digit of the eight-digit number, the releasing winding I of relay H1 is directly connected in a circuit extending from

(23) Battery, W*i*8, 19*h*1, H1I, 2, 95*m*4, 89*m*3, 83*m*2, 78*m*1, 72*mk*, 28*c*1 to ground.

Let us now assume that the number 442—2334 is to be selected. The first group of digits—442—is to identify the destination exchange, while the second group —2334—designates the station to be called through this destination exchange, which station in turn may be connected to a further exchange. Depression of one of the keys T1 to T*n* causes selection of the number 442, while depression of one of the keys T*p* to T*q*, say for example key T*p*, causes selection of the number 2334.

Contacts 118*zp* to 125*zp* (Fig. 1*b*) of relay Z*p* constitute a contact field, the outlets of which are designated I' to VIII'. This contact field corresponds in its construction to that formed by the contacts 2*z*1 to 9*z*1 of relay Z1. It is multipled with the corresponding contact fields of the remaining marker relays of the second group, as indicated in the drawings. The multiple in turn is connected to the contact field of relays M1 to M4 and M*k* over contacts 109*u* to 116*u* of relay U. An independent outlet IX' is connected with this contact field over contact 117*u* of relay U.

In conformity with the number 442—2334 to be called, the following multipling scheme applies to the contact field outlets.

| 442—2334 | Jumpers between outlets |
|---|---|
| 4 | 4—I |
| 4 | 4—II |
| 2 | 2—III |
| Switch-over wiring | IX—IV |
| 2 | 2—I' |
| 3 | 3—II' |
| 3 | 3—III' |
| 4 | 4—IV' |
| Switch-over wiring | IX'—V' |

The sequence of operations following depression of key T1 is the same as described above. Upon release of key T1, contact 14*an* of relay A*n* closes circuit (6). Relay J starts to transmit selection impulses. Key T*p* is depressed afer release of key T1, energizing relay Z*p*. Contact 97*zp* connects relay H2 (having contacts 98*h*2 to 103*h*2) in parallel with relay Z*p*. Relays Z*p* and H2 are held over contact 98*h*2 and 22*c* after release of the key T*p*. In circuit (6), contact 102*h*2 is closed in addition.

The reverse order of operation of keys T1 and T*p* is inadmissible. It would result in a faulty connection. It is rendered ineffective by contact 99*h*2 of relay H2. If key T*p* is depressed first—which by itself does not yet amount to faulty operation—opening of contact 99*h*2 prevents the subsequent operation of relay Z1 by key T1. As contact 16*h*1 remains closed, the holding winding II of relay A*n* is now under the control of key T*p*. Upon release of this key, relay A*n* is restored and closes circuit (6).

The energizing circuits for relay V1 in the selection of the first digit group—442—are as follows:

(24) Battery, V1I, 18*h*1, 34*sk*, 39—1, 45—2, 50—3, 56—4, jumper 4—I, 2*z*1, 95*m*4, 89*m*3, 83*m*2, 78*m*1, 72*mk*, 28*c*1 to ground;

(25) Battery, V1I, 18*h*1, 34*sk*, 39—1, 45—2, 50—3, 56—4, jumper 4—II, 3*z*1, 96*m*4, 90*m*3, 84*m*2, 72*mk*, 28*c*1, to ground; and

(26) Battery, V1I, 18*h*1, 34*sk*, 39—1, 45—2, jumper 2—III, 6*z*1, 84*m*2, 72*mk*, 28*c*1, to ground.

The switch-over releasing circuit for relay H1 extends from

(27) Battery, W*i*8, 19*h*1, H1I, 2, jumper IX—IV, 5*z*1, 90*m*3, 84*m*2, 72*mk*, 28*c*1, to ground.

Simultaneously with the release of relay H1, the circuit for relay A*n* is again completed at contacts 68*v*1 and 101*h*2. Relay A*n* will not be restored again until after the delayed-release relay V1 has opened its contact 68*v*1, such restoration also taking place with a delay since relay A*n* continues to be energized by the discharge current of capacitor C*o*8 over contact 11*an*. Thus, there will be a prolonged interval before circuit (6) is again closed at contact 14*an*, this interval being of such length as to accommodate any possible time length for completing the switching through of the connection after selection of the first group of digits.

The holding circuit for relays M1 to M4 and M*k* of the counting chain for the series of selection pulses has been temporarily interrupted at contacts 64*v*1 and 17*h*1 and at contact 14*an* respectively. The counting chain is thus returned to the normal position.

Selection of the second group of digits is initiated by release of relay A*n*, whose contact 14*an* again closes circuit (6), although this time without contact 17*h*1. At the same time, relay U is emergized over contact 19*h*1; its contacts 109*u* to 116*u* make contacts 118*zp* to 125*zp* of relay Z*p* effective (relay Z1 having been disabled at contact 15*h*1 by the restoring relay H1). Contact 18*h*1 has closed the circuit for winding II of relay V2 having contacts 104*v*2 to 108*v*2. Relay V2 performs the same functions as relay V1. Its contact 104*v*2 in each step interrupts circuit (6) and the holding circuits for the impulse counting chain. Contact 106*v*2 steps the counting chain for the impulse series. Contact 107*v*2 connects capacitor C*o*5 to winding II of relay V2. This relay thus obtains the delay in restoration required as the hunting interval between successive selection impulse series. Contact 108*v*2 closes the circuit for the releasing winding I of relay H2 after each series of selection impulses.

In the numerical example selected for illustration, the circuits for energizing relay V2 are successively as follows:

(28) Battery, V2I, 18*h*1, 34*sk*, 39—1, 45—2, jumper 2—I', 118*zp*, 109*u*, 95*m*4, 89*m*3, 83*m*2, 78*m*1, 72*mk*, 28*c*1, to ground;

(29) Battery, V2I, 18*h*1, 34*sk*, 39—1, 45—2, 50—3, jumpers 3—II', 119*zp*, 110*u*, 96*m*4, 90*m*3, 84*m*2, 72*mk*, 28*c*1, to ground;

(30) Battery, V2I, 18*h*1, 34*sk*, 39—1, 45—2, 50—3, jumper 3—III', 122*zp*, 113*u*, 84*m*2, 72*mk*, 28*c*1, to ground; and

(31) Battery, V2I, 18*h*1, 34*sk*, 39—1, 45—2, 50—3, 56—4, jumper 4—IV', 121*zp*, 112*u*, 90*m*3, 84*m*2, 72*mk*, 28*c*1, to ground.

The circuit for switch-over releasing relay H2 after selection of the final digit of the second digit group extends from

(32) Battery, H2I, 103*h*2, 108*v*2, jumper IX'—V', 120*zp*, 111*u*, 96*m*4, 90*m*3, 84*m*2, 72*mk*, 28*c*1, to ground.

Restoration of relay H2 releases the automatic selector in the same manner as described above with reference to relay H1. Specifically, contact 100*h*2 restores relay C1, and contact 29*c*1 of the latter restores relay C. Contact 98*h*2 opens the holding circuit for relays Z*p* and H2.

The automatic selector may be prematurely released by depression of error key JT or by replacing the receiver. This causes opening of circuit (5) at key contacts JTI and JTII or at the switchhook contact GU, as the case may be Relay C1 is therepon restored and releases relay C. Depression of the error key moreover causes the holding circuit for the then operating marker and auxiliary relays, for example circuit (3), to be opened at key contact JTI so that these relays are restored prior to the seizing relay C.

Changes may be made within the scope and spirit of the appended claims.

We claim:

1. In a telephone system, a device at a calling station for automatically successively transmitting series of impulses respectively corresponding to numerical digits, for successively controlling switches at an exchange required for extending calls to desired stations to be called, a time interval being respectively interposed between the successive transmission of the corresponding series of impulses, said device comprising key means for setting up numerical digits designating a desired called station, electrical digit control means responsive to actuation of said key means for subdividing the numerical digits set up by said key means into at least a first digit part which identifies the exchange over which the corresponding call is to be extended and a second digit part which identifies the desired called station in said exchange, said second digit part containing more than one series of impulses, and electrical circuit means for automatically transmitting said first digit part and for thereafter automatically transmitting the impulse series contained in said second digit part after the lapse of a time interval which is greater than the time interval to be respectively interposed between the successive transmission of the impulse series contained in said second digit part.

2. In a telephone system, a device at a calling station for automatically successively transmitting series of impulses respectively corresponding to numerical digits, for successively controlling switches at an exchange required for extending calls to desired stations to be called, a time interval being respectively interposed between the successive transmission of the corresponding series of impulses, said device comprising a plurality of key means including at least one key means for setting up all the numerical digits designating a desired called station, electrical digit control means responsive to actuation of said one key means for subdividing the numerical digits set up thereby into at least a first digit part which identifies the exchange over which the corresponding call is to be extended and a second digit part which identifies the desired called station in said exchange, said second digit part containing more than one series of impulses, and electrical circuit means for automatically transmitting said first digit part and for thereafter automatically transmitting the impulse series contained in said second digit part after the lapse of a time interval which is greater than the time interval to be respectively interposed between the successive transmission of the impulse series contained in said second digit part.

3. In a telephone system, a device at a calling station for automatically successively transmitting series of impulses respectively corresponding to numerical digits, for successively controlling switches at an exchange required for extending calls to desired stations to be called, a time interval being respectively interposed between the successive transmission of the corresponding series of impulses, said device comprising a plurality of key means including at least one pair of key means for respectively setting up a first group of numerical digits designating an exchange containing the line extending to a desired called station and a second group of numerical digits designating said desired called station in said exchange, electrical digit control means responsive to actuation of said pair of key means for recognizing the respective groups of numerical digits set up by said pair of key means, and electrical circuit means governed by said digit control means for automatically transmitting impulse series corresponding to said first group of numerical digits and for thereafter transmitting impulse series corresponding to said second group of numerical digits after the lapse of a time interval which is greater than the time interval respectively interposed between the successive transmission of the impulse series contained in said first group of numerical digits and to be interposed between the successive transmission of the impulse series contained in said second group of numerical digits.

4. A system and cooperation of parts according to claim 3, comprising means governed by the sequence of actuation of the respective key means for controlling the transmission of said first group of numerical digits.

5. A system and cooperation of parts according to claim 4, comprising means for counting the impulse series contained in the respective groups of numerical digits being transmitted, and means governed by said counting means for controlling the transmission of said impulse series.

References Cited in the file of this patent

UNITED STATES PATENTS

| | | |
|---|---|---|
| 1,965,146 | Kluge | July 3, 1934 |
| 2,108,140 | Patterson et al. | Feb. 15, 1938 |
| 2,391,911 | MacKenzie | Jan. 1, 1946 |
| 2,656,417 | Kilburg | Oct. 20, 1953 |